(12) United States Patent
Komlev et al.

(10) Patent No.: US 11,985,523 B2
(45) Date of Patent: *May 14, 2024

(54) METHOD AND DEVICE FOR MANAGING MULTIPLE REMOTE RADIO HEADS IN COMMUNICATION NETWORK

(71) Applicant: Samsung Electronics Co., Ltd., Gyeonggi-do (KR)

(72) Inventors: Anton Komlev, Warsaw (PL); Maksymilian Augustyn, Warsaw (PL); Sungbum Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 304 days.

This patent is subject to a terminal disclaimer.

(21) Appl. No.: 17/466,053

(22) Filed: Sep. 3, 2021

(65) Prior Publication Data
US 2021/0400505 A1    Dec. 23, 2021

Related U.S. Application Data

(63) Continuation of application No. 16/858,991, filed on Apr. 27, 2020, now Pat. No. 11,115,843.

(30) Foreign Application Priority Data

May 31, 2019    (KR) ........................ 10-2019-0064713

(51) Int. Cl.
*H04W 24/04*    (2009.01)
*H04L 41/0604*    (2022.01)
(Continued)

(52) U.S. Cl.
CPC ......... *H04W 24/04* (2013.01); *H04L 41/0609* (2013.01); *H04L 41/069* (2013.01); *H04W 88/085* (2013.01)

(58) Field of Classification Search
CPC ... H04W 24/04; H04W 88/12; H04W 88/085; H04W 24/00
(Continued)

(56) References Cited

U.S. PATENT DOCUMENTS 6,501,735 B1    12/2002    Han
6,990,335 B1    1/2006    Shamoon
(Continued)

FOREIGN PATENT DOCUMENTS

CN    103761172    8/2016
WO    WO 2016/112858    7/2016

OTHER PUBLICATIONS

Biskupski, Pawel, "LTE-new challenges", Moscow, Mar. 1, 2014, pp. 37, https://www.itu.int/en/ITU-D/Regional-Presence/CIS/Documents/Events/2014/03_Moscow/Session_2_Biskupski.pdf.
(Continued)

*Primary Examiner* — Qutbuddin Ghulamali
(74) *Attorney, Agent, or Firm* — The Farrell Law Firm, P.C.

(57) ABSTRACT

Disclosed is a method for managing multiple remote radio heads (RRHs) in a communication network, the method including, in response to an alarm indicating that a value of an operation parameter of an RRH among the multiple RRHs is beyond a predetermined range, predicting whether the RRH is faulty, based on one or more pieces of operation information of the RRH which respectively correspond to one or more timestamps; and issuing a notification indicating that the RRH is faulty when it is predicted that the RRH is faulty, wherein the one or more pieces of operation information of the RRH comprise at least one of information related to an uptime of the RRH, information related to a type of the alarm, information related to a state of the RRH, and information related to an environment of the RRH.

18 Claims, 6 Drawing Sheets

(51) Int. Cl.
*H04L 41/069* (2022.01)
*H04W 88/08* (2009.01)

(58) Field of Classification Search
USPC .......................................................... 455/424
See application file for complete search history.

(56) References Cited

U.S. PATENT DOCUMENTS

| | | |
|---|---|---|
| 8,527,310 B1 | 9/2013 | Capetz et al. |
| 9,753,800 B1 | 9/2017 | Jadunandan et al. |
| 10,278,081 B2 | 4/2019 | Cotanis |
| 10,791,507 B1 | 9/2020 | Mukherjee |
| 2002/0021231 A1* | 2/2002 | Schlager ............ G08B 21/0269 340/984 |
| 2002/0021321 A1* | 2/2002 | Nakajima .............. B41J 29/393 347/19 |
| 2002/0152305 A1* | 10/2002 | Jackson ................. H04L 43/00 709/224 |
| 2002/0170002 A1* | 11/2002 | Steinberg .............. H04L 41/064 714/39 |
| 2007/0030156 A1 | 2/2007 | Schlager |
| 2009/0227249 A1* | 9/2009 | Ylitalo ................. H04B 7/0408 455/562.1 |
| 2010/0211831 A1 | 8/2010 | Fujiyama |
| 2010/0325267 A1 | 12/2010 | Mishra et al. |
| 2011/0053530 A1 | 3/2011 | Kenington et al. |
| 2012/0157089 A1 | 6/2012 | Yang et al. |
| 2012/0331050 A1 | 12/2012 | Wilbur et al. |
| 2014/0036704 A1* | 2/2014 | Han .................. H04W 52/0229 370/252 |
| 2014/0141831 A1 | 5/2014 | Ma |
| 2015/0244562 A1 | 8/2015 | Hanson |
| 2016/0198293 A1* | 7/2016 | Mitsuze ................ H04L 41/507 455/456.1 |
| 2017/0041815 A1* | 2/2017 | Fernandez Arboleda .................... H04W 24/04 |
| 2017/0353873 A1 | 12/2017 | Aksela et al. |
| 2019/0141785 A1 | 5/2019 | Chou et al. |
| 2020/0013160 A1 | 1/2020 | Francis |
| 2020/0108939 A1 | 4/2020 | Tsaliah |
| 2020/0314004 A1 | 10/2020 | Rashad |
| 2021/0400505 A1* | 12/2021 | Komlev ................ H04L 41/069 |

OTHER PUBLICATIONS

Amirijoo, M., "Cell Outage Management in LTE Networks", Sep. 28-30, 2009, pp. 18, http://www.fp7-socrates.eu/files/Presentations/SOCRATES_2009_COST%202100%20Braunschweig%20presentation%20-%20Cell%20outage%20management.pdf.

Wikipedia, "Alarm fatigue", Sep. 9, 2019, pp. 3, https://en.wikipedia.org/wiki/Alarm_fatigue.

Samsung, "LTE eNB Alarm Manual for PKG 6.0.0", Jun. 1, 2016, pp. 385.

International Search Report dated Apr. 28, 2020 issued in counterpart application No. PCT/KR2020/001036, 8 pages.

European Search Report dated Apr. 14, 2022 issued in counterpart application No. 20813040.1-1216, 9 pages.

European Search Report dated Feb. 15, 2024 issued in counterpart application No. 20813040.1-1216, 4 pages.

* cited by examiner

METHOD AND DEVICE FOR MANAGING MULTIPLE REMOTE RADIO HEADS IN COMMUNICATION NETWORK

CROSS-REFERENCE TO RELATED APPLICATION(S)

This application is a Continuation Application of U.S. patent application Ser. No. 16/858,991, filed on Apr. 27, 2020, in the United States Patent and Trademark Office, which is based on and claims priority under 35 U.S.C. § 119 to Korean Patent Application No. 10-2019-0064713, filed on May 31, 2019, in the Korean Intellectual Property Office, the entire disclosure of each of which is incorporated by reference herein in its entirety.

BACKGROUND

1. Field

The disclosure relates generally a communication network, and more particularly, to a method and a device for managing multiple remote radio heads (RRHs) in a communication network and a device for detecting faults in RRHs.

2. Description of Related Art

Generally, a domain technician may find faulty RRHs by inspecting alarms, which are rules specifying acceptable values of RRH operation parameters. That is, an alarm may occur when a value of an RRH operation parameter is beyond an acceptable range. However, the alarms are only guidelines for the domain technician and do not necessarily indicate a hardware fault. Due to a hierarchical attribute of a network in which the RRHs report to an evolved node B (eNB) and the eNB reports to an element management system (EMS), it is necessary for many technicians to share a responsibility to cope with the alarms. After analyzing the alarms, the technicians may determine to issue an order to inspect on-site and may replace a unit when an actual hardware fault is found.

Another approach to improve network reliability includes self-organizing networks (SONs) characterized by self-configuration, self-optimization, and self-healing. Self-healing may automatically apply corrective actions after key performance indicators (KRIs) reach a threshold value.

For example, in large-scale networks including at least 100,000 nodes, it is impractical for people to analyze all alarms. Even in such an instance, detecting a faulty node is undertaken in an arts or science field, and thus, people may have a false positive/false negative rate at which an order to inspect on-site is issued. This may cause exorbitant costs and numerous errors.

Although the SON approach is based on dynamic threshold values, the corrective actions are automated. However, such threshold values are based on KPIs defined on upper layers of an open systems interconnection (OSI) model. The corrective actions may be normally understood as a cell outage compensation which is a reconfiguration of existing nodes for covering the faulty node. However, since the nodes have limited capacities, the cell outage compensation may quickly saturate the existing nodes. Further, since the cell outage compensation is based on high-level KPIs, fundamental approaches to network security may be neglected.

Other approaches to the SONs may be dependent on data from UEs, which may invade privacy of end-users. Therefore, downloading data from the nodes compromises user privacy and is therefore limited from at least a security standpoint.

Thus, there is a need in the art for a more secure method of finding faults in RRHs in large-scale networks.

SUMMARY

Aspects of the disclosure are to address at least the above-mentioned problems and/or disadvantages and to provide at least the advantages described below.

Accordingly, an aspect of the disclosure is to provide a method for efficiently finding faults in RRHs in a large-scale network.

Another aspect of the disclosure is to provide a method for detecting and predicting a fault in an RRH, irrespective of threshold values.

Another aspect of the disclosure is to provide a method for detecting and predicting a fault in an RRH independent of UE data which may invade privacy of a user.

Another aspect of the disclosure is to provide a method for managing multiple RRHs in a communication network, the method including, in response to an alarm indicating that a value of an operation parameter of an RRH among the multiple RRHs is beyond a predetermined range, predicting whether the RRH is faulty, based on one or more pieces of operation information of the RRH which respectively correspond to one or more timestamps; and issuing a notification indicating that the RRH is faulty when it is predicted that the RRH is faulty, wherein the one or more pieces of operation information of the RRH comprise at least one of information related to an uptime of the RRH, information related to a type of the alarm, information related to a state of the RRH, and information related to an environment of the RRH.

Another aspect of the disclosure is to provide a device for managing multiple RRHs in a communication network is provided, the device includes a communication interface; a memory; and a processor connected to the communication interface and the memory. The processor is configured to in response to an alarm indicating that a value of an operation parameter of an RRH among the multiple RRHs is beyond a predetermined range, predict whether the RRH is faulty, based on one or more pieces of operation information of the RRH which respectively correspond to one or more timestamps; and issue a notification indicating that the RRH is faulty when it is predicted that the RRH is faulty, wherein the one or more pieces of operation information of the RRH comprise at least one of information related to an uptime of the RRH, information related to a type of the alarm, information related to a state of the RRH, and information related to an environment of the RRH.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Hereinafter, embodiments of the disclosure will be described in reference to the accompanying drawings. However, the disclosure is not limited to the embodiments set forth below, and may be implemented in various alternative forms. Descriptions of known functions and/or configurations will be omitted for the sake of clarity and conciseness.

Although terms such as "first" and "second" may be used herein to modify various elements, it will be apparent that such elements are not limited by these terms. These terms are intended only to distinguish between one element and another element. Therefore, it will be apparent that "a first element" as mentioned below may be "a second element", and vice-versa, within the technical idea of the disclosure.

Figure 1:
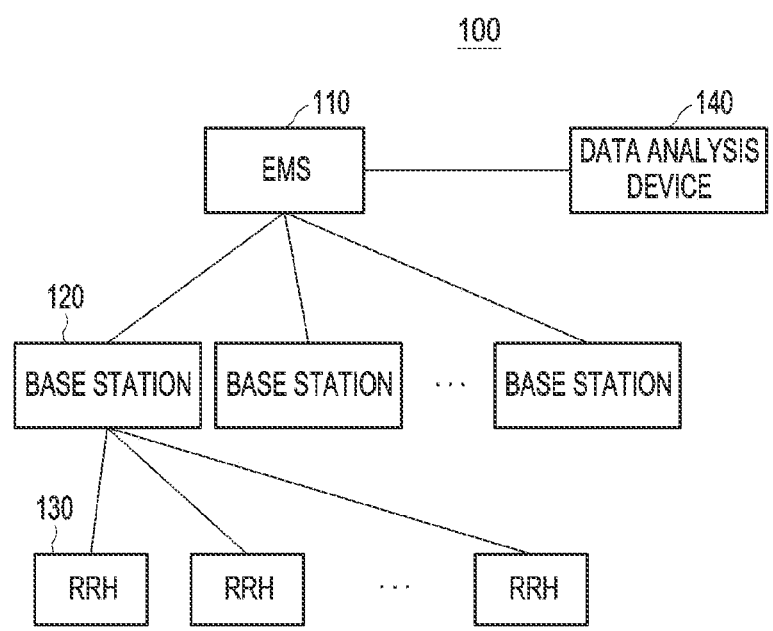
FIG. 1 illustrates a communication system according to an embodiment.

FIG. 1 illustrates a communication system according to an embodiment. The communication system may be for providing a wireless communication service by using wireless communication technologies, such as long term evolution (LTE), LTE-advanced (LTE-A), and fifth generation (5G). Wireless communication technologies to be used for the communication system are not limited to the exemplified technologies. A communication system 100 may include an EMS 110, multiple base stations 120, multiple RRHs 130, and a data analysis device 140.

The EMS 110 is connected to the multiple base stations 120 and manages elements of the communication system 100 including the multiple base stations 120 and the multiple RRHs 130 connected to the multiple base stations 120. The EMS 110 may store an alarm log. An alarm may be generated by the RRHs 130 or the base stations 120 when operation parameter values of the RRHs 130 are beyond an allowable range. The alarm may indicate that there are likely to be faults in the RRHs 130 but does not always indicate that the RRHs 130 are faulty. The EMS 110 may include a log of each RRH 130 connected to the base stations 120 connected to the EMS 110.

Each base station 120 may be referred to as a node B or an eNB. One or more RRHs 130 may be connected to one base station 120. All the base stations 120 are not required to be necessarily connected to the RRHs 130. Each base station 120 may provide a communication service to a user equipment (UE) directly or through the RRHs 130 connected thereto. The base stations 120 may transfer, to the EMS 110, information regarding operations of the RRHs 130 connected to the base stations 120, which information may include alarms for the RRHs 130 and operation parameters of the RRHs 130. Each base station 120 may store, as a hardware log, information regarding operation parameters of one or more RRHs 130 connected thereto.

The RRHs 130 may be connected to the base stations 120 in a wireless or wired manner and may provide a communication service to the LIE through the base stations 120. The RRHs 130 may issue an alarm when the operation parameters of the RRHs 130 are beyond an allowable range. The RRHs 130 may transfer the operation parameters of the RRHs 130 to the base stations 120 connected to the RRHs 130, and the base stations 120 may issue an alarm when values of the operation parameters of the RRHs 130 are beyond an allowable range.

The data analysis device 140 may be configured as an individual entity and may detect or predict a fault in each RRH 130 on the basis of information received from the EMS 110 and the base stations 120. The data analysis device 140 may be included in the EMS 110 or in each of the base stations 120.

Figure 2:
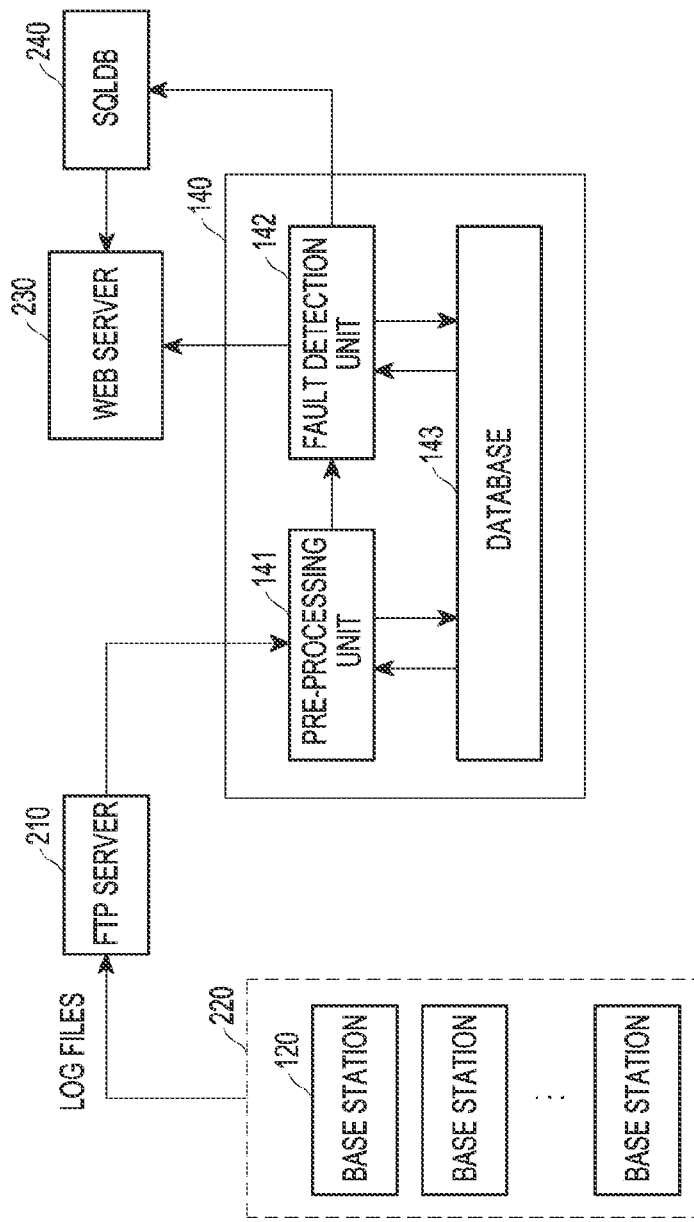
FIG. 2 is a block diagram of a system according to an embodiment.

FIG. 2 is a block diagram of a system according to an embodiment. The data analysis device 140 includes a pre-processing unit 141, a fault detection unit 142, and a database 143.

The pre-processing unit 141 may pre-process log files received from multiple base stations 220 including the base stations 120. The log files may be transferred to the data analysis device 140 through a file transfer protocol (FTP) server 210 but the transfer of the log files is not necessarily limited thereto. The data analysis device 140 may directly acquire log files from the multiple base stations. The log files may include logs of RRHs 130 connected to the multiple base stations 220. The logs of the RRHs 130 may be human-readable text files which include timestamps and feature values of the operation parameters of the RRHs 130.

The data analysis device 140 may acquire the log files according to one mode selected from among multiple modes. A first mode among the multiple modes may be referred to as an asynchronous mode. In the first mode, which has low system overhead, the data analysis device 140 may acquire and read a notification log, which is a list of alarms and the RRHs 130 corresponding thereto. The notification log may not include operation parameters of the RRHs 130. The data analysis device 140 may acquire a log of each of the RRHs 130 from the base stations 120 or the EMS 110 on the basis of the notification log. For example, the data analysis device 140 may acquire a log of an 130 corresponding to a recently issued alarm from the base stations 120 or the EMS 110 on the basis of the notification log.

A second mode among the multiple modes may be referred to as a synchronous mode. In the second mode, the data analysis device 140 may access the base stations 120 or EMS 110 to acquire logs of the RRHs 130 in real time. The second mode may be faster in operation speed than the first mode.

A third mode among the multiple modes may be referred to as an asynchronous inbound mode. In the third mode, when an alarm occurs, the base stations 120 may access the data analysis device 140 and store a log of an RRH 130 corresponding to the alarm in the data analysis device 140. The third mode has low overhead on a network, but when an access problem occurs, the log of the RRH 130 may not be transferred to the data analysis device 140.

The pre-processing unit 141 may pre-process logs of the RRHs 130 to acquire information (i.e., operation parameters of the RRHs 130) related to operations of the RRHs 130. Examples of the information related to operations of the RRHs 130 may be as follows:

1. Time data, such as uptime (operation time) measurement value
2. Alarm type (types of alarm)
3. Binary RRH state, indicating whether elements of an RRH are turned on or off
4. Actual RRH state, such as frequency and transmission power firmware version 5. Sensor measurement value, such as temperature, power, voltages, and other values registered in relation to an RRH and an environment of the RRH The RRH operation-related information acquired by the pre-processing unit 141 may be stored in the database 143, which is related to a big data platform.

The pre-processing unit 141 may generate an n×k-dimensional input matrix, which indicates values of parameters in given timestamps, from extracted metrics (i.e., operation parameters of the RRHs 130). Values of parameters in previous timestamps may be acquired from the database 143. An n-dimension of the input matrix indicates values of metrics, and a k-dimension of the input matrix indicates the number of values in multiple timestamps. That is, k refers to the number of the multiple timestamps. The dimensions of the input matrix may change depending on a model for detecting or predicting a fault in each RRH 130. The model may use a statistical technique based on big data regarding operation information of the RRHs 130 to presume whether each RRH 130 is faulty on the basis of operation information of the RRH 130 according to the multiple timestamps.

The fault detection unit 142 loads the model for detecting or predicting faults in each RRH 130 and may determine whether the RRH 130 is faulty on the basis of the loaded model and the input matrix. The fault detection unit 142 may generate a binary output, such as 0 or 1, indicating whether the RRHs 130 are faulty.

The model is a package of feature transformations combined with prediction means. The model may receive an n×k-dimensional input matrix and output a binary result. A k-dimension of the input matrix is model-dependent and the data analysis device 140 may automatically adjust the input matrix according to the number chunks which the model can receive. The model can be uploaded by a user and a predetermined model may be used for detecting or predicting a fault in each RRH 130. Examples of models are as follows:

1. A model which uses an artificial neural network and scales an input matrix to (−1, 1), wherein the artificial neural network has a feedforward—Long short-term memory (LSTM)—feedforward architecture and has one output unit activated by rectified linear unit (ReLU).
2. A model which removes extreme values of z-transform and features, and classification using a support vector machine (SVM).

An output from the fault detection unit 142 (i.e. an output of a model) may be stored in the database 143. When the output from the fault detection unit 142 illustrates that the RRHs 130 are faulty, the fault detection unit 142 may issue a notification indicating that the RRHs 130 are faulty. The notification may be transmitted to a web server 230 in order to make a request for troubleshooting, and may be recognized by an application for managing the RRHs 130 executed in the web server 230. A manager of the web server 230 may identify that the RRHs 130 are faulty on the basis of a notification from the application. After a manual inspection in the troubleshooting, an inspection result according to an output from the fault detection unit 142 may be determined to be erroneous. Such an inspection result with respect to RRHs 130 for which alarms have been cleared may be determined to be erroneous through individual inspections. An actual inspection result different from the output from the fault detection unit 142 may be input by a user and may be stored in the database 143.

Output values from the fault detection unit 142 and information regarding RRHs 130 related thereto may be stored in a structured query language database (SQLDB) 240. The SQLDB 240 may store and manage statistics related to faults in the RRHs 130. The data analysis device 140 may further include a scheduler configured to calculate the statistics related to the faults in the RRHs 130 and generate a report relating thereto. The statistics and the report generated by the scheduler may be transferred to the SQLDB 240.

When the output from the fault detection unit 142 reveals that the RRHs 130 are not faulty, alarms issued by the base stations 120 or the RRHs 130 may be cleared.

Figure 3:
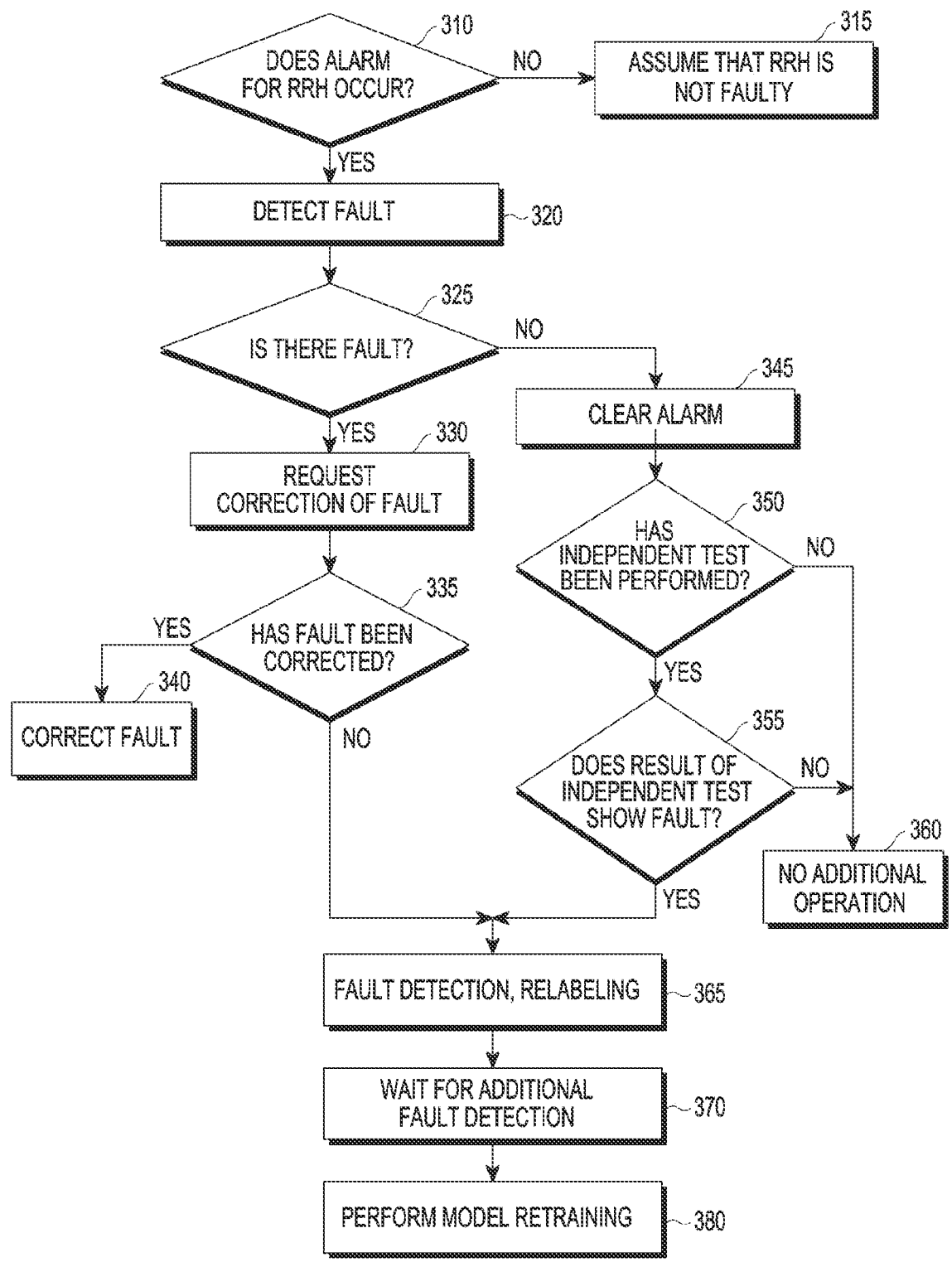
FIG. 3 illustrates a method for managing a fault in an RRH according to an embodiment.

FIG. 3 illustrates a method for managing a fault in an RRH 130 according to an embodiment.

The data analysis device 140 determines whether an alarm for the RRH 130 occurs in step 310. The alarm for the RRH 130 may be issued by the RRH 130 or base station 120 when an operation parameter of the 130 is beyond a predetermined allowable range.

When it is determined that the alarm for the RRH 130 does not occur, the data analysis device 140 assumes that the RRH is not faulty in step 315 and may not perform any subsequent operation.

When it is determined that the alarm for the RRH 130 occurs, the data analysis device 140 performs an operation for detecting (or predicting) a fault in the RRH 130 in step 320. The operation for detecting a fault in the RRH 130 may include inputting one or more pieces of operation information of the RRH 130 corresponding to multiple timestamps in a model for detecting the fault in the RRH 130 to identify an output value of the model. The one or more pieces of operation information may be acquired from the database 143 and/or a log of the RRH 130.

The data analysis device 140 determines whether there is a fault in the RRH 130 based on a result of the operation of detecting of a fault in step 325.

When it is determined that there is a fault in the RRH 130, the data analysis device 140 requests a correction of the fault in step 330, which may include issuing a notification indicating that the RRH 130 is faulty and transmitting the notification to the web server 230.

In response to the request for the correction of the fault, the fault may be attempted to be manually corrected by a technician or automatically corrected. According to such an attempt to correct the fault, it is determined whether the fault has been corrected by the technician, the EMS 110, the data analysis device 140, or the web server 230 in step 335. When it is determined that the fault has been corrected, it is concluded that the fault has been corrected in step 340 and any additional operation may not be performed. When it is determined that the fault has not been corrected, the data analysis device 140 determines that a result of fault detection step 320 is erroneous and may perform relabeling in step 365, which is a correction of the result of fault detection step 320 and may be stored in the database 143.

When it is determined in step 325 that there is no fault in the RRH 130, an alarm is cleared in step 345. The data analysis device 140 may transmit a message for clearing the alarm to the EMS 110, the base stations 120, or the RRH 130.

After the alarm is cleared, it may be determined whether an independent inspection has been performed in step 350. The independent inspection is for determining whether an RRH 130 regardless of the alarm is faulty, and may be manually performed by a technician.

When it is determined that the independent inspection has not been performed, no additional operation is performed in step 360.

When it is determined that the independent inspection has been performed, it is determined whether a result of the independent inspection reveals a fault in step 355. When it is determined that the result of the independent inspection does not reveal a fault, any additional operation may not be performed in step 360. When it is determined that the result of the independent inspection reveals a fault, the data analysis device 140 determines that the result of fault detection step 320 is erroneous and may perform relabeling in step 365.

After relabeling step 365, the data analysis device 140 waits for an additional fault detection in step 370. The additional fault detection may include the fault detection in step 320 according to the occurrence of an alarm or in step 350 according to the independent inspection.

Thereafter, the model may be retrained in step 380. The retraining may refer to storing, in the database 143, operation information of the RRH 130 according to multiple timestamps and a result of whether there is actually a fault in the RRH 130 and updating the model for detecting a fault in the RRH 130 according thereto.

Figure 4:
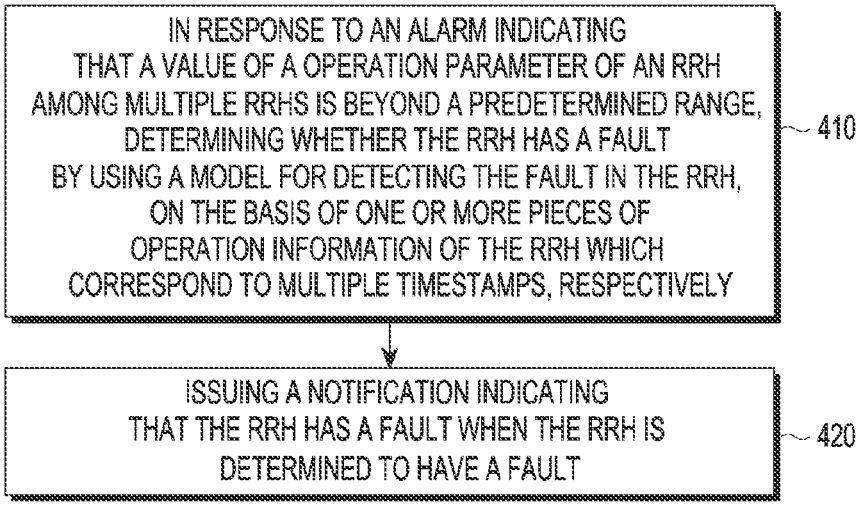
FIG. 4 illustrates an operation of a data analysis device according to an embodiment.

FIG. 4 illustrates an operation of a data analysis device according to an embodiment.

In step 410, in response to an alarm indicating that a value of an operation parameter of an RRH 130 among multiple RRHs is beyond a predetermined range, the data analysis device 140 determines whether the RRH 130 is faulty by using a model for detecting a fault in the RRH 130 based on one or more pieces of operation information of the RRH 130 which correspond to multiple timestamps, respectively. An input of the model for detecting a fault in the RRFI 130 is an n×k input matrix, and an output of the model for detecting a fault in the RRH 130 is a value indicating whether the RRH 130 is faulty, wherein n is the number of the one or more pieces of operation information of the RRH 130 and k is the number of the multiple timestamps.

In step 420, when the RRH 130 is determined to be faulty, the data analysis device 140 issues a notification indicating that the RRH 130 is faulty, which notification may be transmitted to the web server 230.

Figure 5:
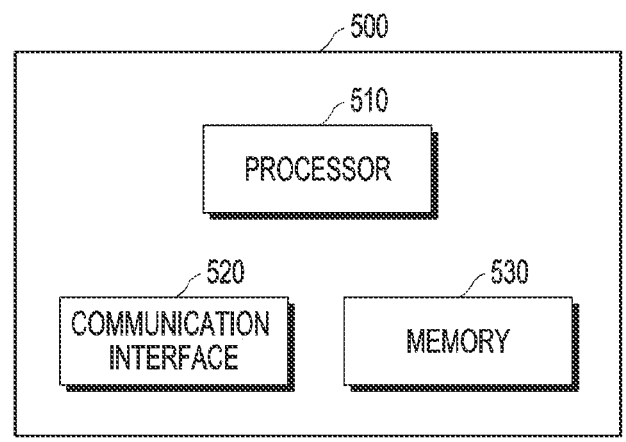
FIG. 5 is a block diagram of a device for managing multiple RRHs according to an embodiment.

FIG. 5 is a block diagram of a device 500 for managing multiple RRHs 130 according to an embodiment. The device 500 may be the data analysis device 140.

The device 500 includes a processor 510, a communication interface 520, and a memory 530. The processor 510 may be connected to the communication interface 520 and the memory 530 to control operations of the communication interface 520 and the memory 530. The processor 510 may control an operation of the device 500 and may perform calculations necessary for the operation of the device 500.

The communication interface 520 is for transmitting or receiving data between the device 500 and other entities, and may include at least one of an interface for LTE, LIE-A, wireless fidelity (Wi-Fi), Wi-Max, Bluetooth®, Wi-Bro, and code division multiple access (CDMA), and an interface for accessing a network in a wired manner. A communication technology supported by the communication interface 520 is not limited to the above-mentioned examples.

The memory 530 may store commands to be executed by the processor 510, temporary or non-temporary data necessary for calculations executed by the processor 510, and a database 143. The memory 530 may include temporary and/or non-temporary memory.

Figure 6:
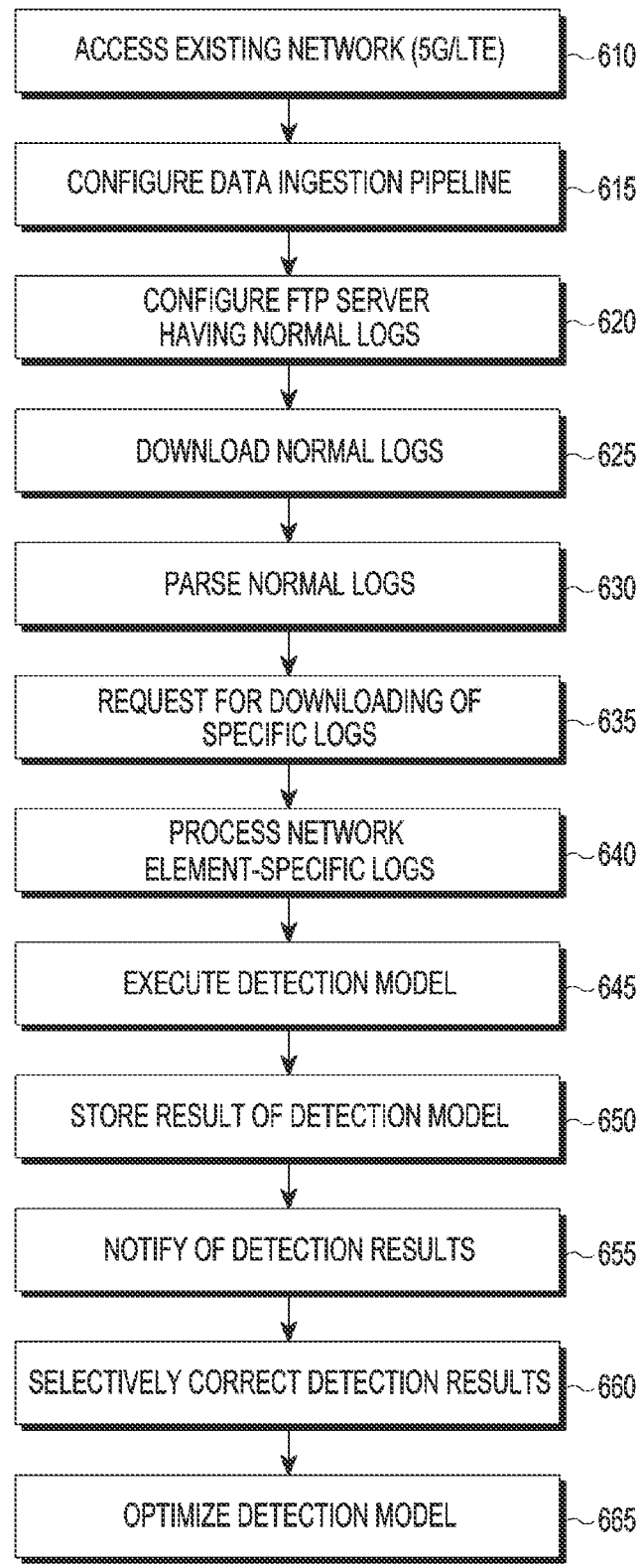
FIG. 6 illustrates a method for managing a fault in an RRH through a remote data collector according to an embodiment.

FIG. 6 illustrates a method for managing a fault in an RRH through a remote data collector according to an embodiment. The remote data collector may be the device 500 for managing the multiple RRHs 130 in FIG. 5.

The remote data collector accesses an existing network (5G/LTE) in step 610. The network may include multiple base stations and multiple RRHs connected to the multiple base stations. The remote data collector may manage faults in the RRHs.

The remote data collector configures a data ingestion pipeline in step 615 after accessing the existing network. The data ingestion pipeline is a path for collecting information related to detecting faults in the RRHs, and may be changeable. For example, the influx of data may be event-driven or synchronous. Data may be reported at the time of an alarm or at all times (i.e. in real time). Push-based data ingestion may also be performed. For example, base stations may push metrics and logs to a selective data gateway.

The remote data collector configures an FTP server having normal logs after configuring the pipeline in step 620. The FTP server may receive log files from multiple base stations and transfer the log files to the remote data collector.

The remote data collector downloads normal logs after configuring the FTP server in step 625. The normal logs may be downloaded from the FTP server.

The remote data collector parses the downloaded normal logs in step 630. The normal logs may correspond to notification logs. The remote data collector may identify, from the normal logs, an RRH for which an alarm has been issued.

The remote data collector requests the downloading of specific logs according to a result of the parsing of the normal logs in step 635. Each of the specific logs may refer to a log of a specific RRH. Specifically, the remote data collector may request the downloading of logs of the RRH for which an alarm has been issued and which has been identified through the parsing of the normal logs.

The remote data collector processes network element-specific logs in step 640, which refers to the downloaded logs of the RRH for which an alarm has been issued.

Based on information obtained from the logs of the RRH for which an alarm is issued, the remote data collector may execute a detection model in order to detect whether the RRH is faulty in step 645. The executed detection model may vary. For example, one among generative models (e.g. graphical models), generative adversarial networks, and discriminative models (e.g. neural networks or random forests) may be selectively used.

The remote data collector may store a result of the executed detection model in step 650 and may notify of the detection results in step 655. The notification of the detection results may be made in various manners, such as through a visual dashboard, an application program interface (API), or an e-mail, but is not limited thereto.

The remote data collector selectively corrects the detection results in step 660, so as to correspond to actual occurrence or nonoccurrence of a fault when a result of fault prediction according to the detection model is different from the actual occurrence or nonoccurrence of a fault.

The remote data collector optimizes the detection model in step 665. The optimizing of the detection model may be achieved through the accumulation of data input in the detection model, the storage of the detection results, and the selective correction of the detection results.

As described above, a defect in an RRH may be predicted without the assistance of a person skilled in the art. The prediction is not dependent on UE data, and thus, a user's privacy may be protected.

Although the embodiments have been described in detail herein, it should be clearly understood that many variations and modifications of the present disclosure herein described, which may appear to those skilled in the art, will still fall within the spirit and scope of the of the present disclosure as defined in the appended claims and their equivalents.

What is claimed is:

1. A method for managing multiple remote radio heads (RRHs) in a communication network, the method comprising:
   in response to an alarm indicating that a value of an operation parameter of an RRH among the multiple RRHs is beyond a predetermined range, predicting whether the RRH is faulty, based on one or more pieces of operation information of the RRH which respectively correspond to one or more timestamps; and
   issuing a notification indicating that the RRH is faulty when it is predicted that the RRH is faulty,
   wherein the one or more pieces of operation information of the RRH comprise at least one of information related to an uptime of the RRH, information related to a type of the alarm, information related to a state of the RRH, and information related to an environment of the RRH.

2. The method of claim 1, further comprising:
   acquiring a log of the RRH among the multiple RRHs;
   acquiring at least one piece of the operation information of the RRH corresponding to at least one timestamp from the log of the RRH; and
   storing, in a database, the at least one timestamp and the acquired operation information of the RRH.

3. The method of claim 2, further comprising asynchronously reading alarms from an element management system (EMS) and a notification log comprising a list of RRHs corresponding to the alarms,
   wherein the log of the RRH is acquired based on the notification log.

4. The method of claim 2, wherein the log of the RRH of the multiple RRHs is acquired from an element management system (EMS) or a base station in real time.

5. The method of claim 2, wherein the log of the RRH of the multiple RRHs is transmitted from an element management system (EMS) or a base station in response to the alarm for the RRH.

6. The method of claim 2, further comprising storing, in the database, a result of predicting whether the RRH is faulty.

7. The method of claim 1, wherein a model for detecting a fault in the RRH is used for predicting whether the RRH is faulty,
   wherein an input of the model for detecting the fault in the RRH is an n×k input matrix, and an output of the model for detecting the fault in the RRH is a value indicating whether the RRH is faulty, and
   wherein n is a number of the one or more pieces of operation information of the RRH, and k is a number of the one or more timestamps.

8. The method of claim 1, wherein the information related to the state of the RRH comprises at least one of information on a frequency used by the RRH, information on a transmission power, and information on a firmware version.

9. The method of claim 1, wherein the information related to the environment of the RRH comprises information related to at least one of temperature, power, and voltage.

10. A device for managing multiple remote radio heads (RRHs) in a communication network, the device comprising:
    a communication interface;
    a memory; and
    a processor connected to the communication interface and the memory, wherein the processor is configured to:
       in response to an alarm indicating that a value of an operation parameter of an RRH among the multiple RRHs is beyond a predetermined range, predict whether the RRH is faulty, based on one or more pieces of operation information of the RRH which respectively correspond to one or more timestamps; and
       issue a notification indicating that the RRH is faulty when it is predicted that the RRH is faulty,
    wherein the one or more pieces of operation information of the RRH comprise at least one of information related to an uptime of the RRH, information related to a type of the alarm, information related to a state of the RRH, and information related to an environment of the RRH.

11. The device of claim 10, wherein the processor is further configured to:
    acquire a log of the RRH among the multiple RRHs;
    acquire at least one piece of the operation information of the RRH corresponding to at least one timestamp from the log of the RRH; and
    store, in a database, the at least one timestamp and the acquired operation information of the RRH.

12. The device of claim 11, wherein the processor is further configured to asynchronously read alarms from an element management system (EMS) and a notification log comprising a list of RRHs corresponding to the alarms, and
    wherein the log of the RRH is acquired based on the notification log.

13. The device of claim 11, wherein the log of the RRH of the multiple RRHs is acquired from an element management system (EMS) or a base station in real time.

14. The device of claim 11, wherein the log of the RRH of the multiple RRHs is transmitted from an element management system (EMS) or a base station in response to the alarm for the RRH.

15. The device of claim 11, wherein the processor is further configured to store, in the database, a result of predicting whether the RRH is faulty.

16. The device of claim 10, wherein a model for detecting a fault in the RRH is used for predicting whether the RRH is faulty,
    wherein an input of the model for detecting the fault in the RRH is an n×k input matrix, and an output of the model for detecting the fault in the RRH is a value indicating whether the RRH is faulty, and
    wherein n is a number of the one or more pieces of operation information of the RRH, and k is a number of the one or more timestamps.

17. The device of claim 10, wherein the information related to the state of the RRH comprises at least one of information related to a frequency used by the RRH, information related to transmission power, and information related to a firmware version.

18. The device of claim 10, wherein the information related to the environment of the RRH comprises information related to at least one of temperature, power, and voltage.

* * * * *